United States Patent [19]

Glumac

[11] 4,372,514

[45] Feb. 8, 1983

[54] MOBILE STORAGE PLATFORM

[76] Inventor: Nick P. Glumac, 355 Litchfield Rd., Kingsford Heights, Ind. 46346

[21] Appl. No.: 187,349

[22] Filed: Sep. 15, 1980

[51] Int. Cl.³ .............................................. F16M 11/32
[52] U.S. Cl. .................... 248/163 R; 108/91; 108/53.3; 414/498
[58] Field of Search ................ 108/91, 53.3; 248/163; 206/505-507; 414/498, 495

[56] References Cited

U.S. PATENT DOCUMENTS

| | | | |
|---|---|---|---|
| 1,934,389 | 11/1933 | Ulsh | 108/53.3 |
| 3,331,520 | 7/1967 | Bridge | 414/498 |
| 3,408,965 | 11/1968 | Hamilton et al. | 108/91 |
| 3,409,163 | 11/1968 | Lockwood | 206/505 |
| 3,664,272 | 5/1972 | Sanders | 108/53.3 |
| 3,995,760 | 12/1976 | Burgdorf et al. | 414/498 |

FOREIGN PATENT DOCUMENTS 718326  11/1954  United Kingdom ................ 108/91

Primary Examiner—William E. Lyddane

[57] ABSTRACT

A mobile storage platform having pairs of legs which downwardly converge toward each other in a manner to permit the legs of the platform to nest and wherein means are provided to prevent jamming of the nesting pairs of legs both in the longitudinal and in the lateral direction.

2 Claims, 5 Drawing Figures

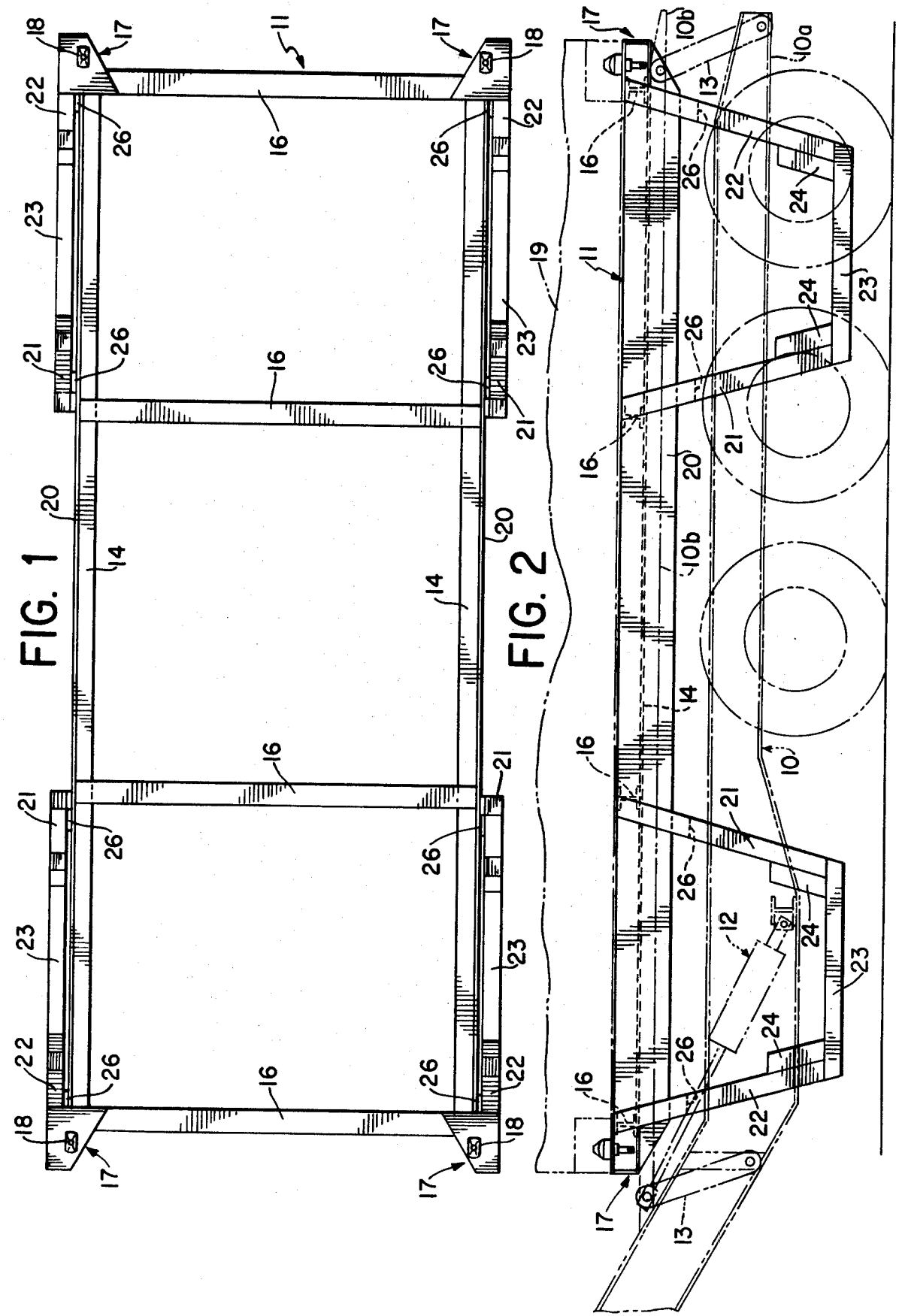

MOBILE STORAGE PLATFORM

BACKGROUND OF THE INVENTION

The present invention is an improvement in the construction and design of mobile storage platforms of the type used in conjunction with liftable bed trucks trailers or in conjunction with liftable bed cargo transport means. Liftable bed trailers generally speaking employ a fixed bed and a liftable bed superimposed thereon in the loading mode which can be maneuvered under a mobile storage platform. Thereafter, the liftable bed is raised causing the legs of the storage platform to be lifted from the ground to a sufficient height to pass over normal road variances.

A basic purpose for the utilization of mobile storage platforms and liftable bed cargo transport means is to permit the preloading of the storage platforms and the transport of cargo on the storage platform as separate and distinct steps. In other words, steel cargo may be successively loaded upon storage platforms in a depot and in fact kept in storage for some time prior to the transporting of the loaded storage platforms to another location. This is a great saving in time and money since the storage platforms are inexpensive as capital investment in comparision with truck trailers which might otherwise be initially loaded with cargo. Furthermore, loading of cargo upon many storage platforms as a distinct initial step greatly saves in the utilization of manpower.

Since preloading of an entire cargo, for example, from a ship or railroad train is the most efficient way to use the aforesaid system, it is important to utilize available loading space at a depot, and it is important, therefore, that storage platforms themselves when unloaded not take up more than minimal space. In accordance with one aspect of the present invention, a storage platform has been designed which may be nested and successively stacked upon other storage platforms in a manner to permit successive removal of individual platforms without difficulty. The design is such that fifteen to twenty large storage platforms may be stacked and nested, and the design is such that the nesting parts are freely removed from the nested position.

In accordance with another aspect of the present invention, the storage platform has been constructed to provide critical structural support to shipping containers so that the strength of the platform is maximized where required while the amount of steel needed to construct each platform is kept to a minimum.

These features will become apparent upon a further reading of the specification which follows:

SUMMARY OF THE INVENTION

The present invention concerns novel improvements with respect to mobile storage platforms having a horizontal frame or loading platform and supporting legs connected thereto wherein the improvement resides in the fact that the supporting legs are arranged in pairs, at least two pairs along each longitudinal side, the legs of each pair converging from their connector with the frame, a foot piece joined to the converging free ends of each pair, stop means attached to said converging ends and spacer means intermediate the upper ends of said legs and said frame, whereby a plurality of essentially identical mobile storage platforms may be stacked one upon the other with the converging pairs of legs of a next upper platform being received within the pairs of a next lower platform, said pairs nesting within each other and said stop means limiting nesting to prevent jamming in a longitudinal direction while said spacer means prevents jamming of said legs in a lateral direction.

BRIEF DESCRIPTION OF THE DRAWING

FIG. 1 is a plan view of a mobile storage platform constructed according to the present invention resting upon a liftable bed trailer;

FIG. 2 is a side elevation of the storage platform of FIG. 1 and of the liftable bed trailer;

DESCRIPTION OF A PARTICULAR EMBODIMENT

Figure 3:
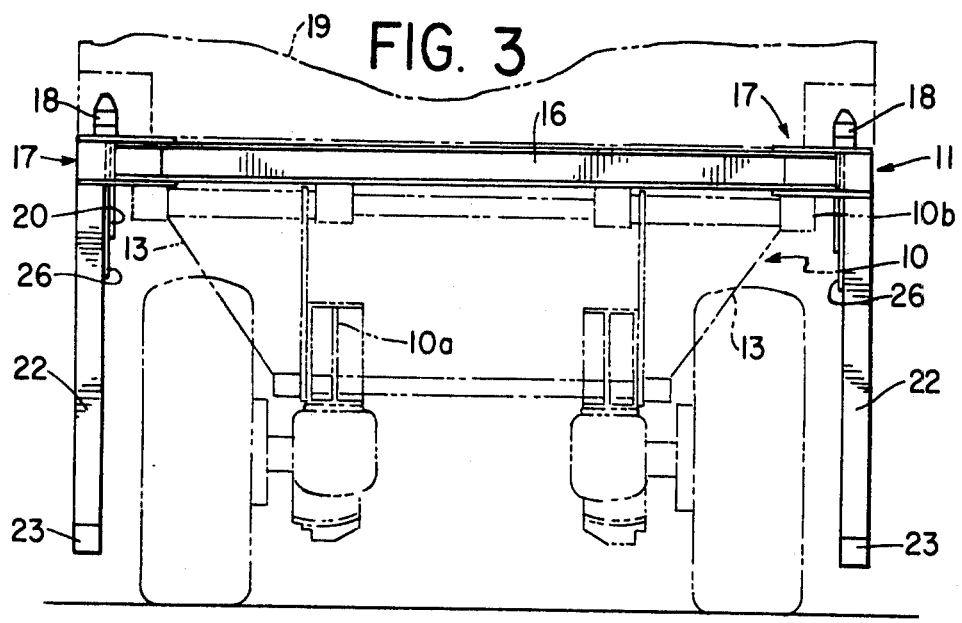
FIG. 3 is a rear elevation of the storage platform of FIG. 1 and of the liftable bed trailer.

Referring now to the drawing and initially to FIGS. 1-3 hereof, a liftable bed trailer 10 has been illustrated in outline having superimposed thereupon a mobile storage platform 11 constructed in accordance with the principle of the present invention. The trailer 10 has a fixed bed 10a and a liftable bed 10b. For present purposes, it will suffice to state that hydraulic actuator means 12 have been provided to effect raising of the liftable bed 10b (supported and guided by rotary arms 13). As best seen in FIGS. 2 and 3, the legs of the storage platform 11 may be lifted clear of the roadway when the liftable bed 10b is in its raised position for transport.

Proceeding now more particularly to a description of the mobile storage platform which is the subject matter of the present invention, the platform 11 comprises peripheral, longitudinal members 14 and lateral members 16 which are welded together to form an open, horizontal platform. At each corner are structures 17 comprising enclosures of sheet steel in which are mounted locking elements 18. As is well known, such elements may engage within receptacles provided in cargo container 19 whose outline has been shown in FIGS. 2 and 3 resting upon the top of the mobile storage platform. A plate 20 is welded to each longitudinal member 14 to form a "T" therewith and to depend downwardly therefrom, and to enclose and abut the ends of the lateral members 16. Four pairs of legs 21 and 22 are welded to the structure just described, each pair being connected at the bottom by horizontal base members 23. Stop members 24 are welded along the lower portions of legs 21 and 22, and spacer members 26 are welded intermediate legs 21, 22 and plate 20 for a purpose which will be described.

The upper ends of legs 21 and 22 are attached to the horizontal frame section of the platform 11 at points ideally suited to support the load. Legs 22 are attached at the four corners, while legs 21 are attached adjacent to the ends of lateral members 16. Each pair of legs 21 and 22 downwardly converge toward each other to facilitate the vertical stacking of many platforms.

Figure 4:
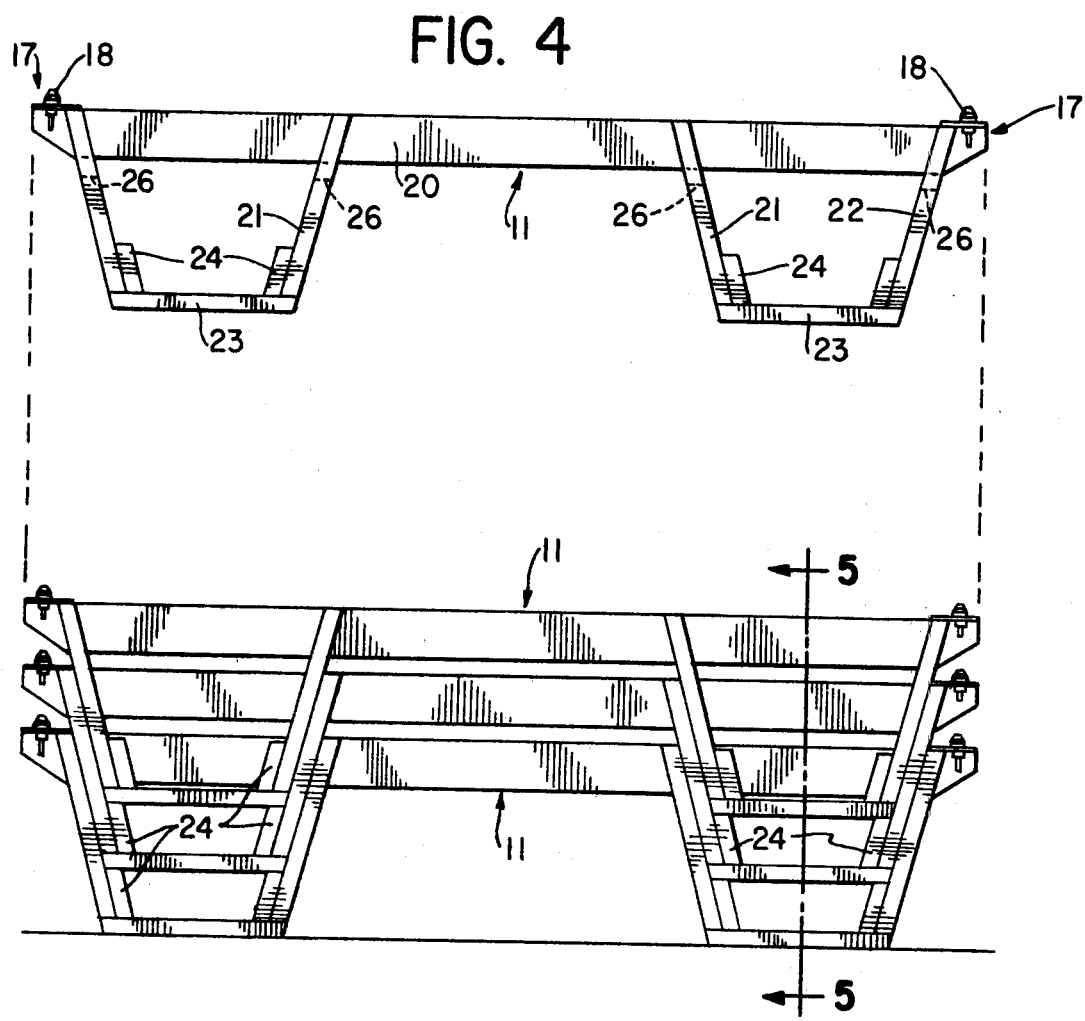
FIG. 4 illustrates the nesting and stackable nature of the mobile storage platforms of the present invention.
Figure 5:
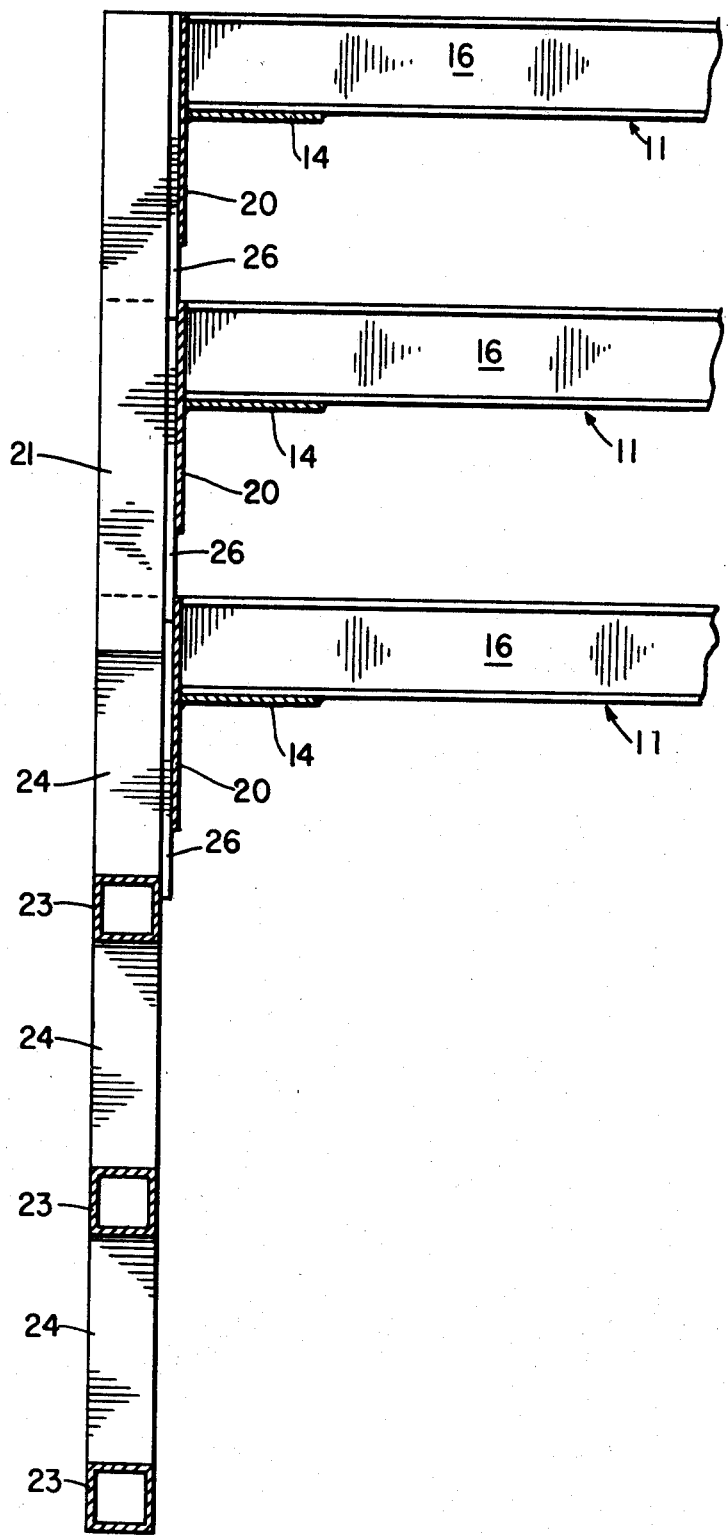
FIG. 5 is a vertical section taken in the direction of arrows 5—5 of FIG. 4.

Referring now to FIGS. 4 and 5, the nesting and stacking feature of the present invention has been illustrated. It will be seen that because of the basic frustoconical shape of each pair of legs 21, 22, the respective pairs nest within each other like drinking cups. Stop members 24 prevent jamming of the pairs of legs 21, 22 in the longitudinal direction, while spacer plates 26 prevent lateral jamming between the stacked platforms. In this manner, it is quite possible to stack a dozen of more mobile platforms and to remove selected ones easily from the stack when needed.

It should be understood that the foregoing description has been of a particular embodiment and is therefore merely representative. In order to understand the scope of the invention reference should be made to the appended claims.

I claim:

1. In a mobile storage platform having at least two peripheral longitudinal members and a plurality of lateral members connected thereto comprising a horizontal frame, and having supporting legs connected to and depending from said frame, the improvement wherein the supporting legs are arranged in pairs, at least two pairs along each longitudinal side, the legs of each pair converging from their connector with the frame, a foot piece joined to the converging free ends of each pair, stop means attached to said converging ends and spacer means intermediate the upper ends of said legs and said frame, whereby a plurality of essentially identical mobile storage platforms may be stacked one upon the other with the converging pairs of legs of a next upper platform being received within the pairs of a next lower platform, said pairs nesting within each other and said stop means limiting nesting to prevent jamming in a longitudinal direction while said spacer means prevents jamming of said legs in a lateral direction.

2. The platform according to claim 1 wherein said longitudinal members consist of a horizontal web joined to a vertical web, said lateral members are I-beams welded to said longitudinal members, said spacer means is a plate running peripherally outside and along said vertical web, said converging legs are arranged in two pairs along each side of the frame, the upper ends thereof being welded outside of and to the spacer means with the upper end of one leg positioned at the end of said frame and the upper end of the other is positioned at a point where one of said lateral members conjoins with said longitudinal member, and said spacer means are longitudinal members running along and connected to the inner sides of each pair of converging legs.

* * * * *